US012236947B2

United States Patent
D'hoore et al.

(10) Patent No.: US 12,236,947 B2
(45) Date of Patent: Feb. 25, 2025

(54) FLEXIBLE-FORMAT VOICE COMMAND (71) Applicant: Cerence Operating Company, Burlington, MA (US)

(72) Inventors: Bart D'hoore, Merelbeke (BE); Christoph Halboth, Aachen (DE); Holger Quast, Merelbeke (BE); Dino Seppi, Merelbeke (BE); Markus Funk, Ulm (DE); Tom Claes, Merelbeke (BE); Christophe Ris, Merelbeke (BE)

(73) Assignee: Cerence Operating Company, Burlington, MA (US)

( * ) Notice: Subject to any disclaimer, the term of this patent is extended or adjusted under 35 U.S.C. 154(b) by 0 days.

(21) Appl. No.: 18/219,906

(22) Filed: Jul. 10, 2023

(65) Prior Publication Data
US 2024/0046924 A1 Feb. 8, 2024

Related U.S. Application Data (63) Continuation of application No. 17/239,894, filed on Apr. 26, 2021, now Pat. No. 11,735,172.

(51) Int. Cl.
*G10L 15/197* (2013.01)
*G10L 15/06* (2013.01)

(52) U.S. Cl.
CPC .......... *G10L 15/197* (2013.01); *G10L 15/063* (2013.01)

(58) Field of Classification Search
CPC .............. G10L 15/197; G10L 15/063
USPC ........................................ 704/275
See application file for complete search history.

(56) References Cited

U.S. PATENT DOCUMENTS

| 10,388,272 | B1* | 8/2019 | Thomson | G10L 15/22 |
| 11,223,699 | B1* | 1/2022 | Niewczas | G06F 3/167 |
| 11,722,571 | B1* | 8/2023 | Chenier | G10L 17/22 |
| | | | | 709/224 |
| 2013/0297319 | A1* | 11/2013 | Kim | G10L 15/22 |
| | | | | 704/E21.001 |
| 2019/0069017 | A1* | 2/2019 | Marconcini | G09G 5/006 |
| 2019/0206412 | A1* | 7/2019 | Li | G10L 17/00 |
| 2020/0053401 | A1* | 2/2020 | Obara | G11B 27/005 |
| 2020/0310842 | A1* | 10/2020 | Yen | G06F 9/453 |

(Continued)

FOREIGN PATENT DOCUMENTS

| CN | 106713988 A | * | 5/2017 | |
| WO | WO-2020247259 A1 | * | 12/2020 | G06F 3/0484 |

OTHER PUBLICATIONS

D. Wang, D. Hakkani-Tür and G. Tur, "Understanding computer-directed utterances in multi-user dialog systems," 2013 IEEE International Conference on Acoustics, Speech and Signal Processing, Vancouver, BC, Canada, 2013, pp. 8377-8381, doi: 10.1109/ICASSP.2013.6639299. keywords: {Context;Computers;Moti (Year: 2013).*

(Continued)

*Primary Examiner* — Bharatkumar S Shah
(74) *Attorney, Agent, or Firm* — Occhiuti & Rohlicek LLP (57) ABSTRACT

A voice-based system is configured to process commands in a flexible format, for example, in which a wake word does not necessarily have to occur at the beginning of an utterance. As in natural speech, the system being addressed may be named within or at the end of a spoken utterance rather than at the beginning, or depending on the context, may not be named at all.

19 Claims, 3 Drawing Sheets

(56) References Cited

U.S. PATENT DOCUMENTS

2020/0329297 A1* 10/2020 Dutt ................. G10L 15/187
2024/0056633 A1* 2/2024 Garner ............... H04N 21/2187

OTHER PUBLICATIONS

S. Jindal, P. Kankar and T. A. Faruquie, "Reusable dialog component for content selection from large data sets," IEEE Workshop on Automatic Speech Recognition and Understanding, 2005., Cancun, Mexico, 2005, pp. 244-249, doi: 10.1109/ASRU.2005.1566520. keywords: {History;Speech synthesis;Natural langu (Year: 2005).*

D. Wang, D. Hakkani-Tur and G. Tur, "Understanding computer-directed utterances in multi-user dialog systems," 2013 IEEE International Conference on Acoustics, Speech and Signal Processing, Vancouver, BC, Canada, 2013, pp. 8377-8381, doi: 10.1109/IICASSP.2013.6639299. keywords: {Context; Computers; M (Year: 2013).*

S. Jindal, P. Kankar and T. A. Faruquie, "Reusable dialog component for content selection from large data sets," IEEE Workshop on Automatic Speech Recognition and Understanding, 2005., Cancun, Mexico, 2005, pp. 244-249, doi: 10.1109/ASRU.2005.1566520. keywords: {History; Speech synthesis; Natural Ian (Year: 2005).*

L. Comeford, D. Frank, P. Gopalakrishnan, R. Gopinath and J. Sedivy, "The IBM Personal Speech Assistant," 2001 IEEE International Conference on Acoustics, Speech, and Signal Processing. Proceedings (CAT. No.01CH37221), 2001, pp. 1-4 vol. 1, doi: 10.1109/ICASSP.2001.940752. (Year: 2001).

* cited by examiner

FLEXIBLE-FORMAT VOICE COMMAND

CROSS-REFERENCE TO RELATED APPLICATIONS

This application is a continuation of U.S. application Ser. No. 17/239,894, filed on Apr. 26, 2021, the contents of which are incorporated herein.

BACKGROUND OF THE INVENTION

This invention relates to flexible-format voice commands, and more particularly to wake-up-word position in voice commands.

Personal assistants that accept voice input have become pervasive. Various approaches are used by such assistants to identify when audio input, for example picked up by a microphone and containing a speech signal, should be processed by the assistant. One approach uses an explicit indication by a user that they intend to speak to the assistant. Such approaches are sometimes referred to as "push-to-talk" systems by way of analogy to radios or intercoms where a user pushes a "speak" button when they wish to talk. Such systems may be reasonably certain that the user wishes to address the system when the button is pressed because errant pushes of the button may be rare.

A more recent approach makes use of word spotting techniques in which the system monitors a microphone input, for example, continuously or during periods of non-silence or speech-like sounds, seeking to detect the occurrence of a prespecified word or phrase that is a required prefix to commands to the assistant. For example, the prefix "Hey Assistant" may be required to prefix any command, such as "Hey Assistant, turn on the lights," and the assistant can ignore speech that does not begin with the required word or phrase. Such words are often referred to as "wake words," with reference to the word "waking up" the assistant, or "trigger words," with reference to the word triggering an action by the assistant. (In this document, the terms such as "keyword," "key word," "wake word," "wake up word (WUW)," and "trigger word" are used interchangeably, unless a distinction is made explicit, and a "word" in these terms may refer to a multi-word phrase and used interchangeably with the word "phrase," and a "word" may refer to any sound pattern producible by a user, such as a nonsense sound, whether or not representable as a phonetic pronunciation, or a coined proper name.) Typically, the wake word is required to be used at the beginning of a period of speech, for example, occurring at or shortly after the detection of speech, for example, using conventional speech activity detectors. In some applications, the wake word functions as the subject of an imperative command sentence (i.e., naming the agent that is being commanded), and in English such a subject can naturally occur at the beginning of a sentence, however grammatically such a position is not generally required.

Yet another approach makes use of an analysis of the words spoken by a user, without requiring that the command words are prefixed by a wake word. For example, utterances of interest may comprise commands that have a relatively defined structure, and a speech recognizer can convert input speech to word sequences (i.e., automated transcription) and if the word sequence output from the speech recognizer matches a valid command (i.e., prefixed by a wake word), the assistant determines that it should act on the command. If the utterance does not match a valid command, the assistant can ignore the utterance as being an extraneous input, for example, because it is part of a conversation between the user and another listener. Word spotting techniques have also been used to detect occurrences of structured phrases or other grammatical events without first requiring automatic transcription of the audio input. In some systems, other cues can be used to determine if the utterance was intended to be a command, for example, cadence, intonation. If multi-modal input, such as video of the speaker's face as well as audio, is available, yet other cues such as facial expression may be useful in determining whether the input is intended to be a command.

Another development for voice assistants used in some environments, such as in-vehicle environments, is that a user may be able to address multiple different assistants, for example, via a common microphone. One way to distinguish such different assistants is to use different wake words for different assistants and to route the command (i.e., as audio or recognized text) to the appropriate assistant. Alternatively, natural language understanding may be used to determine the most appropriate assistant based on the semantic (i.e., meaning) content of a command.

SUMMARY OF THE INVENTION

In one aspect, in general, a voice-based system is configured to process commands in which a wake word does not necessarily have to occur at the beginning of an utterance. For example, in natural speech, the person being addressed may be named within or at the end of an utterance rather than at the beginning. For example, it may be natural for a user to say "Turn on the dome light Mercedes" to have a vehicle assistant named "Mercedes" turn on the lights. In some examples, a user may specify a person name for their assistant, for example, calling it "Sophie," thereby enabling commands such as "Sophie, play my road trip play list." However, certain positions or context for an assistant's name may be inconsistent with an utterance being a command, and the system may be configured to recognize such utterances as extraneous inputs. For example, part of a conversation such as "Do you like the ride of the new Mercedes I just bought?" or "Did you see Sophie at school yesterday?" may be distinguished from commands directed to assistants named "Mercedes" or "Sophie" based on the position or context of their occurrence. There is a need for an automated voice-based assistant to be able to process natural commands with flexible format to provide a more efficient, easy to use, accurate, and/or desirable user interface.

In yet another aspect, the certainty that an utterance is a command rather than extraneous speech may be informed by a number of factors, including one or more of whether or not a wake word was present, the position or context of the wake word, the particular word sequence uttered, as well as non-speech cues (e.g., cadence, intonation, facial expression etc.). Furthermore, when there are multiple assistants that the user may address, the decision of which assistant is actually being addressed and the decision of whether the utterance is actually a command for that assistant may be made jointly or sequentially rather than independently. For example, one assistant may require that a wake word prefixes a command but permit relatively flexible command word sequences, while another assistant may relax the requirement of a wake word or its position but make use of more constrained command word sequences.

In yet another aspect, processing of an input signal containing speech may somewhat separately detect occurrence of a wake word and detect the utterance of a word sequence corresponding to a valid command. These two determinations may be combined to make a final combined determination that the user intended to utter a command, for example, based on pre-configured reasoning logic.

In another aspect, an audio or transcribed text corpus of commands for one or more assistants may be analyzed to determine the structure of valid commands for those assistants, and a language model (e.g., a statistical language model) may be derived from the corpus for use in processing audio input containing speech. In some examples, the occurrences of wake words and/or names given to assistants, or generic subjects that may not be explicitly defined (e.g., "computer," "automobile," "you"), are identified in the corpus and are essentially replaced with placeholders to permit configuration of different words or names for assistants, including coined names that may not actually occur in the corpus, for use in runtime systems without having to derive new language models. In some examples, the language model used to automatically transcribe an audio input may be biased to avoid missing true occurrences of wake words that are part of commands in the process of automated transcription of audio input.

In another aspect, in general, a method for processing speech commands includes receiving a first audio input from a user and determining whether the first audio input comprises a valid system-direct command. After determining that the first audio input comprises a first system-directed command, the command is acted upon. Determining whether the first audio input comprises a system-directed command includes automatically transcribing the first audio input to produce a first transcribed input, determining a location in the first transcribed input of a first word associated with a first assistant, determining that the first audio input has acoustic characteristics of a spoken command, and determining that the first audio input comprises a system-directed command based on the determined location of the first word and the determining that the first audio input has acoustic characteristics of the a spoken command. Acting on the command comprises invoking the first assistant to act on the first command.

Aspects can have one or more of the following features.

Automatically transcribing the first audio input includes applying an automated speech recognition procedure that permits the first word to occur at a plurality of locations in the output of said speech recognition procedure.

The automated speech recognition procedure uses a statistical language model that permits the first word to occur at the plurality of locations with different probabilities in different locations. In some examples, the statistical language model is determined from a training corpus of utterances in which the first word occurs in various locations in said utterances, and in system directed and not system directed utterances. In some examples, the statistical language model is configured with a plurality of names that are permitted to occur in locations in which the first word can occur. For example, the plurality of names for configuring the statistical language model is determined based on an environment of the user (e.g., based on the names of passengers in a vehicle in which the user is speaking).

Determining whether the audio input comprises a system directed command further includes determining whether the first transcribed input has characteristics of a spoken command. In some examples, this determining is based on a model trained on system directed and non-system directed word sequences.

The method further comprises receiving a second audio input from the user and determining whether the second audio input comprises a valid system-direct command. After determining that the second audio input does not comprise a system-directed command, an assistant is prevented to be invoked to act using the second audio input (e.g., the second audio input is not further processes). Determining whether the second audio input comprises a system-directed command includes automatically transcribing the second audio input to produce a second transcribed input, determining a location in the second transcribed input of a first word associated with a first assistant, and determining that the second audio input does not comprise a system-directed command based on at least one of a determined location of the first word and an acoustic characteristic of the second audio input.

Determining that the second audio input does not comprise a system-directed command is based on the determined location of the first word is not a permitted location for said first word.

The method further comprises receiving a second audio input from a user and determining that the second audio input is a non-system-directed input.

Determining whether the audio input comprises a system-directed command comprises using an auxiliary input comprising at least one of a video signal representing a facial region of the user and a manual input from the user.

The first word associated with the first assistant comprises a name of the first assistant. In some examples in which there are multiple assistants, each assistant may have a distinct name.

Determining the location of the first word comprises determining that the first word occurred at a location other than a beginning of the first command.

Automatically transcribing the audio input uses a speech recognition language model that is configurable to set the first word associated with the first assistant to a user-specified name for the first assistant.

Setting the first word associated with the first assistant to the user-specified name does not require retraining the speech recognition language model.

Determining whether the audio input comprises a system-directed command includes determining to which of a plurality of assistants the command is directed.

Determining to which of the plurality of assistants the command is directed comprises at least one of (a) determining which of a plurality of words associated with respective of the assistants is located in the audio input and (b) determining with which assistant the meaning of the command is associated.

Determining whether the audio input comprises a system-directed command uses different criteria associated with different assistants to determine whether the input comprises a system-directed command.

The different criteria comprise (a) a first criterion requiring that a first word associated with a first assistant be located at the beginning of a command, and (b) a second criterion that permits a second word associated with a second assistant to be at a location other than the beginning of the command and the meaning of the command is associated with the second assistant.

Determining whether the audio input comprises a system-directed command comprises using a state of a dialog between the system and the user in the determining.

In another aspect, in general, a voice-based assistant comprises an audio input device and a computing device configured to perform all the steps of any of the methods set forth above.

In another aspect, in general, a non-transitory machine-readable medium comprises instructions stored thereon, wherein the instructions when executed by a processor cause the processor to perform all the steps of any of the methods set forth above.

Other features and advantages of the invention are apparent from the following description, and from the claims.

DETAILED DESCRIPTION

Figure 1:
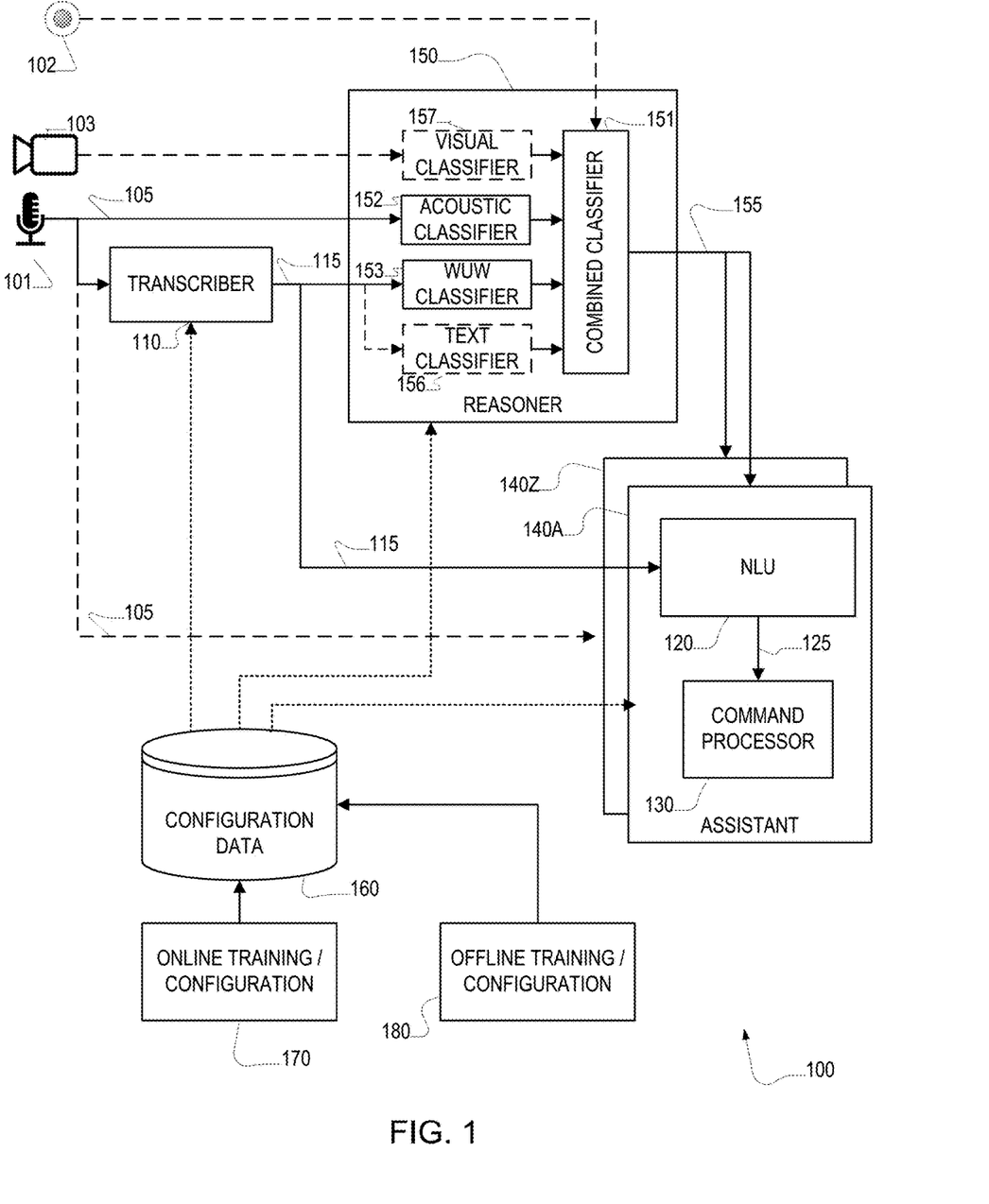
FIG. 1 is a block diagram of a voice-based assistant.

Referring to FIG. 1, in one embodiment, a voice-based assistant 100 makes use of an audio input signal 105, for example, picked up at a microphone 101 (e.g., an electrical and/or digital signal representing an acoustic signal). In general, the audio signal includes a speech signal (e.g., a "voice command" delimited by silence or non-speech input) representing speech produced by a speaker (the "user," not shown in the figure) in the acoustic environment of the microphone (e.g., in a vehicle in which the microphone is mounted, in which case the user may be the driver or possibly a passenger). Optionally, as discussed later in this document, the system includes a "push-to-talk" button 102 that the user may press when speaking or starting to speak, a camera 103 monitoring the user's facial expressions, and other inputs associated with the user.

The assistant 100 is able to process voice commands that have a flexible format. The format is flexible on one or more of the following aspects. First, if the assistant has "wake-up word" (WUW) (e.g., a name given to the assistant), that WUW is not required to be at the start of the voice command, for example, with the WUW being permitted at alternative locations in the voice command or absent completely from the voice command. The name used for the WUW may be configurable for the assistant, and how the WUW is processed and/or required in a voice command may also be configurable to the assistant. Second, the system 100 may include or provide an interface to multiple separate "sub-assistants," for example, in an in-vehicle system, such "sub-assistants" may include an assistant integrated in the vehicle, an assistant integrated into the user's smartphone, and a home assistant accessible over a communication link from the vehicle. When there are such multiple sub-assistants, each may have its own configuration governing the WUW used and requirements of how the WUW is located in a voice command for that assistant. Generally, with these capabilities, the system 100 can provide a flexible and easy-to-use voice interface to the assistant(s) supported by the system.

The system 100 includes a transcriber, which performs an automated speech-to-text conversion (i.e., "speech recognition") of the audio signal 105 to produce a text output 115 representing a sequence of words (or a representation of a set of sequences, such as a list of N best hypotheses) spoken by the user. In some examples, a sequence of words may be accompanied by a score representing a quality of match of the sequence to the input audio or match of individual words to corresponding audio, and the sequence of words may be accompanied by times of occurrence of the words in the sequence permitting alignment of the words with the input audio. The transcriber is configured with configuration data 160, which may include a language model and an acoustic model that is used by the transcriber for the conversion of audio to text. In some implementations, rather than waiting for receipt of an entire utterance in the audio signal before providing the text output, partial transcripts may be provided as the audio signal is acquired and processed by the transcriber. In this way, the system may be able to act with a lower delay (e.g., "latency").

The system processes the audio signal during speech or potentially speech events. Not shown in FIG. 1 is a speech-activity detector that gates the audio signal 105 to only pass signals that have sufficient loudness (e.g., energy) and/or that have speech-like characteristics. Therefore, the system can be thought of as processing sections of input of varying duration triggered by the speech activity detector. Note that in some implementations, rather than gating the audio signal, similar speech activity detection functions may alternatively be integrated into the transcriber or other components that process an ungated audio signal.

The configuration data 160 is generally or largely determined before operation of the system. For example, an offline training/configuration component 180 uses an audio or transcribed text corpus of commands for one or more assistants to determine the structure of valid commands for those assistants, and a language model may be derived from the corpus for use in processing audio input containing speech. For example, the language model may be a statistical language model, meaning that different word sequences are associated with different probability or scores indicating their likelihood. In some cases, such a statistical language model is an "n-gram" model in which statistics on n-long sequences of words are used to build the model. In some cases, some or all of the language model may have a finite-state form, for example, specifying a finite set of well-structured commands. In some cases, such a finite-state form is statistical in that different commands may have different probabilities or scores. In some examples, a combination of approaches, such as n-gram and finite-state forms, are combined in a finite-state transducer. It should be understood that there are a number of alternatives to the form of the language model. In some examples, the occurrences of wake words and/or names given to assistants, or generic subjects that may not be explicitly defined (e.g., "computer," "automobile," "you"), are identified in the corpus and are essentially replaced with placeholders to permit configuration of different words or names for assistants, including coined names that may not actually occur in the corpus, for use in runtime systems without having to derive new language models. In some examples, the language model used to automatically transcribe an audio input may be biased to avoid missing true occurrences of wake words that are part of commands in the process of automated transcription of audio input. In some examples, the language model provides a way to tag output words, for example, to indicate that the word occurred in the position of a subject or assistant name in the language model, and such tags are used in further processing of the output text.

In some examples, the configuration data 160 may be determined in part during operation or shortly before operation of the system. For example, an optional online training/configuration component 170 may receive, from the user, a name they have given to an assistant. For example, the user may say or type the word "Sophie" to name the assistant. The configuration data 160 is then amended to modify the language model to permit the word "Sophie" in the name position in the language model and/or modify the pronunciation of a placeholder for the name with a pronunciation of the word "Sophie," for example, determined by an automated text-to-phoneme converter (e.g., as is used in a speech synthesis system). In some examples, the online training/configuration component 170 may receive other information that is used in configuring components of the system, for example, the names of family members of the user and/or names of passengers in a vehicle. These names may be used to configure the language model to replace a placeholder for non-system names that may be present in utterances spoken by the user but that are not directed to the system.

The text output 115 may not represent a truly intended command. For example, the microphone may detect extraneous conversation between the user and other people in the environment such that the words spoken should not be acted upon. The system 100 represented in FIG. 1 includes a reasoner 150, which includes logic, classifiers and/or models that are used to determine whether the input should be considered to have represented a command uttered (i.e., system-directed input) by the user or extraneous input (i.e., non-system-directed input). Note that in alternative embodiments, the function of the reasoner described below may be integrated into a dialog control component rather than being separate.

A variety of different logical implementations of the reasoner, or its function in a dialog control component can be implemented. The reasoner 150 has available to it a number of inputs that it processes to determine if the input is system-directed or not, and in cases where the system supports multiple different assistants, to which assistant a system-directed input is to be directed. As introduced above, one source of input is the text output 115 of the transcriber, which may be received incrementally as the transcriber processes the audio input 105. Another source of input is the audio signal 105 itself, or possibly a processed version of the audio signal for example, representing a sequence of signal processing features (e.g., corresponding to fixed-length sections/"frames" of the audio signal, and/or utterance features, such as duration, pitch slope, etc.). As illustrated in FIG. 1, the reasoner may optionally receive yet other inputs upon which it makes the system/non-system directed decision. For example, a camera 103 may provide an image of the user's face, and a "push-to-talk" button 102 may provide a signal indicating when the button is pressed.

As introduced above, the reasoner 150 processes both text output 115 and the audio signal 105. The audio signal 105 is processed by an acoustic classifier 152. In some implementations, this classifier is a machine learning classifier that is configured with data (i.e., from configuration data 160) that was trained on examples of system-directed and of non-system directed utterance by an offline training system 180. In some examples, the machine-learning component of the acoustic classifier 152 receives a fixed-length representation of the utterance (or at least the part of the utterance received to that point) and outputs a score (e.g., probability, log likelihood, etc.) that represents a confidence that the utterance is a command. For example, the machine-learning component can be a deep neural network. Note that such processing does not in general depend on any particular words in the input, and may instead be based on features such as duration, amplitude, or pitch variation (e.g., rising or falling pitch). In some implementations, the machine-learning component processes a sequence, for example, processing a sequence of signal processing features (e.g., corresponding to fixed-length frames) that represent time-local characteristics of the signal, such as amplitude, spectral, and/or pitch, and the machine-learning component processes the sequence to provide the output score. For example, the machine learning component can implement a convolutional or recurrent neural network.

One way the reasoner 150 may process the text output 115 is to determine whether WUW occurred at a prescribed location for the assistant (e.g., at the beginning of the voice command). The reasoner includes a WUW classifier 153 that is configured with the WUWs (i.e., names) given to each of the assistants (i.e., system-defined and/or user-defined WUWs) and processes the text output 115 to detect their presence. In addition to being configured with the WUWs, the WUW classifier is configured to determine whether the WUW occurred at a prescribed location for the assistant with which that WUW is associated. This determination may use a variety of techniques. In one such technique, the assistant may be configured to permit one or more of (a) the beginning of a command utterance, (b) at the end of the command utterance, and/or (c) within the utterance and the WUW classifier makes a binary decision of whether the WUW is at an allowable location. If it is, the WUW classifier outputs an indication of which assistant was identified by the WUW, and otherwise provides a negative or no output. In another technique, the context of the WUW in the text output is used to determine whether the WUW occurred at a prescribed position. One such context-based determination uses a trained classifier (e.g., a neural network, a decision tree, etc. trained on system-directed and non-system-directed text transcription), which uses the word context (e.g., a sequence of words before and after the WUW in the text output, or a function of the words such as their parts of speech) to determine a score of the WUW. Note that different assistants may have differently trained scorers for the location of the keyword.

Another way the reasoner 150 may process the text output 115 is using a text-based classifier 156, which inputs the text output 115, and outputs a score that indicates whether that word sequence represents a system-directed command. In some such examples, there may be multiple such classifiers, one trained for each of the assistants. In some examples, the text output is pre-processed, for example, replacing words with syntactic categories such as parts of speech, semantic classes such as person name or assistant name, and/or trained embedding such as contextualized word embeddings (e.g., BERT). The text output and/or its preprocessed form are then processed using the classifier to indicate whether the text output (or a partial text output available while the transcriber 110 is still processing the audio signal 105 and the user has not yet stopped speaking). In FIG. 1, the text-based classifier 156 is indicated as optional with a dotted line. It should be understood that in general, the reasoner 150 may include the WUW classifier 153, the text classifier 156, some other text-based classifier, or any subset of one or more of such text-based classifiers.

In some examples, the reasoner implements a classifier that takes advantage of yet other input to make the classification. For example, video from the camera 103 monitoring the user's facial expressions, lip movement, etc., is provided to a visual classifier 157 of the reasoner 150 to aid in the classification. In a machine learning approach, such a video signal may be processed using a machine learning approach that is trained on video (i.e., image sequences) for users making system-directed and non-system-directed utterances. In some examples, the video is processed in conjunction with the audio, essentially combining functions of the acoustic classifier 152 and visual classifier 157 (e.g., to permit taking advantage of relationships between visual and audio cues that help determine when the user intends for an utterance to be system directed).

Another way that the reasoner 150 has evidence that the user intends for an utterance to be system directed is if they press the "push-to-talk" button 102 before they start to speak or during the interval that they were speaking.

In some alternative embodiments, the reasoner processes the audio input 105 with a conventional word spotter configured to detect particular words. For example, a Hidden-Markov Model (HMM) based word spotter may be used.

The reasoner 150 then combines the outputs of the various classifiers it has at its disposal (e.g., one or more of classifiers 152-152, 156-157). In some implementations, a combined classifier 151 users predetermined logic and/or arithmetic combinations of the scores of the classifiers to yield an overall determinization of whether the input (e.g. the audio, text, and possibly video and button) represent a system directed utterance. In some implementations, this classifier is itself trained on instances of system-directed and non-system-directed inputs, for example, being implemented as a decision tree, neural network, or other parameterized and configurable classifier. In general, each of the classifiers have scores or probabilities of the utterance or partial utterance being system directed associated with them, and the reasoner may essentially use such quantities to weigh the different factors. For example, a very strong indication that a WUW occurred at a required position may make up for a relatively lower score from the text or acoustic classifier, resulting in the reasoner declaring that the input was intended to be a voice command for the assistant. Conversely, because a WUW is not always required, a low score from the WIW classifier may be compensated for by a high score from the acoustic classifier or the text classifier.

Note that in a number of the techniques for processing inputs to the reasoner, the classifiers involved were configured based on training. Such training may be the same for all users of the system, but it should be understood that the configurations may be retrained to a particular user (e.g., the user that is known to be driving a vehicle) and/or adapted to that user during use by collecting that user's system directed and non-system-directed utterances. In such a way, the performance of the reasoner may be improved.

In some implementations, if WUW classifier 153 determines that a WUW was detected in isolation, the output of the reasoner may indicate to the relevant assistant that is should enter into a follow-up dialog, for example, causing a "how can I help you?" or "what can Mercedes do for you?" prompt. Note that in some situations, a degree of dialog control is implemented by the combination of the reasoner and the assistant in order to carry over the context in processing a next utterance to account for the higher likelihood that the next audio input is a voice command and for that command to be directed to the assistant identified by the WUW in the previous input.

In situations in which the reasoner 150 determines that an utterance is a system-directed command directed to a particular assistant, it sends a reasoner output 155 to one of the assistants 140A-Z with which the system 100 is configured. As an example, assistant 140A includes a natural language understanding (NLU) 120, whose output representing the meaning or intent of the command is passed to a command processor 130, which acts on the determined meaning or intent.

Various technical approaches may be used in the NLU component, including deterministic or probabilistic parsing according to a grammar provided from the configuration data 160, of machine-learning based mapping of the text output 115 to a representation of meaning, for example, using neural networks configured to classify the text output and/or identify particular words as providing variable values (e.g., "slot" values) for identified commands. The NLU component 120 may provide an indication of a general class of commands (e.g., a "skill") or a specific command (e.g., and "intent"), as well as values of variables associated with the command. The configuration of the assistant 140A may use configuration data that is determined using a training procedure and stored with other configuration data in the configuration data storage 160.

In some implementations in which there are multiple sub-assistants, the WUW for such an assistant may be detected. However, rather than relying on the transcription of the audio input when it is initiated by the reasoner, the assistant processes the original audio signal 105 (which may have been buffered to be able to "roll back" the input so that the assistant gets the entire utterance from the point when speech was detected). For example, if the WUW corresponds to a home assistant (e.g., "Alexa" or "Hey Google"), the audio input 105 may be transmitted to the home assistant for processing. For example, in a vehicle, the user may say "Alexa, open the garage door" and the word spotting output 145 may indicate the presence of "Alexa" at the start of the voice command, but the text output may not be correct and the original audio is provided to the Alexa assistant for processing to cause the garage door to open.

In alternative embodiments, the reasoner generally has more contextual information available to it in making the determination of whether the audio input includes a valid voice command. As introduced above, a history of previous utterances or possibly feedback from the assistants (e.g., from a dialog control component of an assistant indicating that it is expecting a follow-up utterance from the user) may add further evidence of whether an utterance is system directed and/or to which assistant it is directed. As another example, when there is only a driver in the car and no passengers, the reasoner can decide to initiate a dialog in a situation where otherwise the reasoner may have ignored an input because it appeared to be an inter-person communication. For example, recognition of "boy my Mercedes sure is comfortable" may be ignored when there are passengers, while prompting a "what can Mercedes do for you?" if the driver is alone in the car and therefore not communicating with anyone else. Similarly, if the reasoner has the context that the driver is on a telephone call (e.g., using the handsfree system), it may inhibit acting on any voice input, or have a higher threshold score in order to act.

As introduced above, the reasoner may be configured with words (e.g., names) that may appear in the position of a wake word in an utterance. For example, the names of users or other people in the acoustic environment may be known to the system. For example, "Angela," "John," "mom," "dad" may be such words. These words may be configured in the system, or determined dynamically, for example, based on a personal key fob being used in a vehicle, personal cellphones being detected from their RF emissions etc. With this type of configuration, the reasoner can use occurrences of these words in the subject position of an utterance as an indication that the utterance is not a command intended for an assistant. Essentially, these words may be used as imposters for the names of assistants and/or used to replace placeholders in the grammar in which person names may occur. In the case of assistants whose names sound similar to such configured names of users or other people, performance of the system may be improved by reducing "false alarms" acting on utterances that are not intended to be commands.

As introduced above, the system may include or provide access to multiple different voice-based assistants. In some situations, an assistant may determine that it is not in fact the assistant that should process the command. In some embodiments, there is a mechanism to override the decision made by the reasoner, essentially rejecting the utterance followed by the reasoner passing the utterance on to another assistant. For example, based on an initial part of an utterance, a command may be classified as an in-vehicle command to be handled by a built-in vehicle based assistant, but one performing fuller NLU on the utterance, it does not map to a function of the vehicle-based assistant, and after being returned to the reasoner, the utterance may be sent instead to a home-based assistant.

Figure 2:
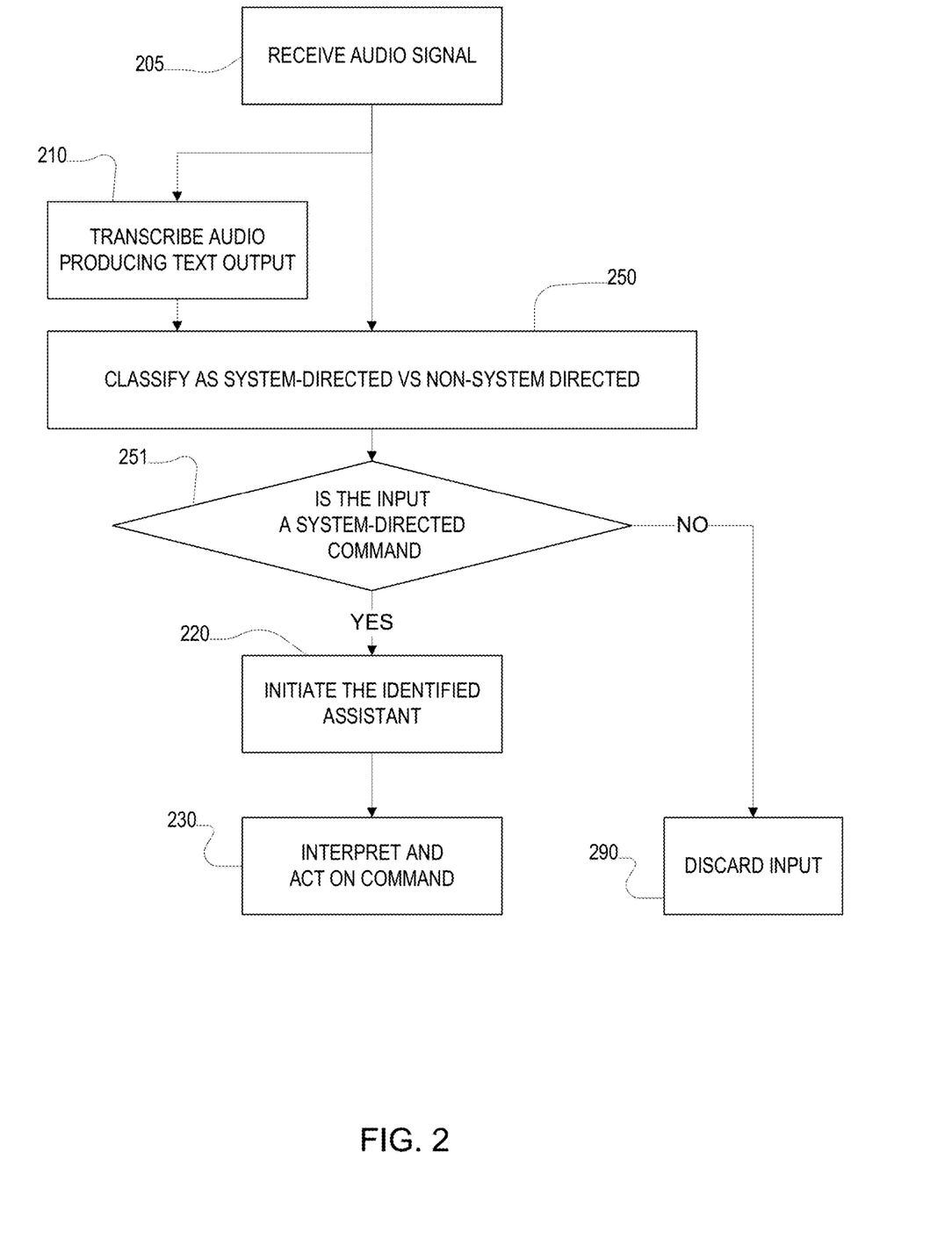
FIG. 2 is a flowchart of processing of an audio input.

Referring to FIG. 2, an example of processing of an input audio signal begins with receiving the audio signal (step 205). Note that in some embodiments, the receiving of the audio signal is triggered by a speech activity detector, or by an acoustic energy detector, so that the processing only occurs when there is a reasonable likelihood that the user is addressing the system. Other inputs, such as a camera input that uses facial characteristics (e.g., lip motion, facial expression, etc.), or an explicit "push-to-talk" button press, may be used to trigger when the acquiring or processing of the audio signal begins.

As discussed above, the audio signal is automatically transcribed (step 210), while in parallel, the audio signal is passed to the reasoner. The text output from the transcribing (step 21) and the audio signal are then processed to classify the input as system directed versus not system directed (step 250). If the determination is that the input is not system directed (step 251), the input is discarded (step 290), while if the determination is that there was a command, the identified assistant is initiated (step 220) and the command is interpreted and acted upon by the identified assistant (step 230).

A variety of alternative implementations may be used to achieve similar user-visible functionality. The system above may be considered to be a two-class classifier: system-directed input vs extraneous input. The presence, lack of presence, and/or location of the WUW is one source of evidence provided to the reasoner, which essentially implements the classifier. The NLU output, as well as other contextual information constitutes other inputs to the reasoner implementing the classification.

In some alternative embodiments, the language model is more directly used in the classification. For example, language models statistics (e.g., word sequence probabilities, n-grams, etc.) are computed both for system-directed input as well as for extraneous input and are computed from separate training corpora. The reasoner can then compare the score of transcription under the two language models, for example, applying a threshold to a difference or ratio of the scores to classify the input as a system-directed input vs extraneous. Yet other approaches for "phrase spotting" approaches is implemented in the reasoner to detect utterances that conform exactly or statistically to target grammars or language models can similarly be used, without specifically spotting the WUW on its own.

In some alternatives, a difference or ratio of language model scores as introduced above, and/or phrase spotting scores for valid commands can be added as inputs to a reasoner that includes rule-based and/or procedural logic for making the classification that a system-directed command is part of the utterance.

In some examples, the reasoner implements a trained mapping of a number of inputs (e.g., including context), to make a classification of whether the input is a system-directed command vs extraneous input. For example, a machine-learning approach may be used for training, for example, an artificial neural network (ANN) or other classifier. In some such examples, the audio signal itself and/or the recognized text sequence, or other transformations of the input audio can also be provided to a trained classifier.

In some examples, a two-class classifier may be directly trained on the audio input (e.g., on a signal processed version of the audio input, such as a sequence of feature vectors) to classify the input as system-directed versus extraneous. In some such examples, the classifier essentially functions as a spotter or scorer of valid utterances that inherently weighs the presence of a WUW in an appropriate position within the utterance.

In some alternatives, the reasoner is not necessarily a separate component but rather is part of a dialog control. The dialog control component then uses the internally computed assessment (e.g., classification) of whether an utterance is a system-directed command in controlling the dialog. Furthermore, the dialog state informs the assessment, for example, increasing the belief that an utterance is a system-directed input if provided in response to a prompt from the system, for example, that is part of a confirmation or follow-up dialog.

As introduced above, the system as a whole can be configured, for example, with a user providing a customized name for an assistant, which in turn affects the WUW spotting and the logic implemented by the reasoner in determining whether an input is system directed. More generally, the reasoner may be configurable, for example, with each sub-assistant providing configuration information (e.g., rules, configuration data for a classifier, etc.) that the reasoner uses to determine if an input should be directed to that sub-assistant. Similarly, an NLU component may be configurable to provide a way of processing text input to get the meaning of the command that is to be passed to the assistant or sub-assistant.

Figure 3:
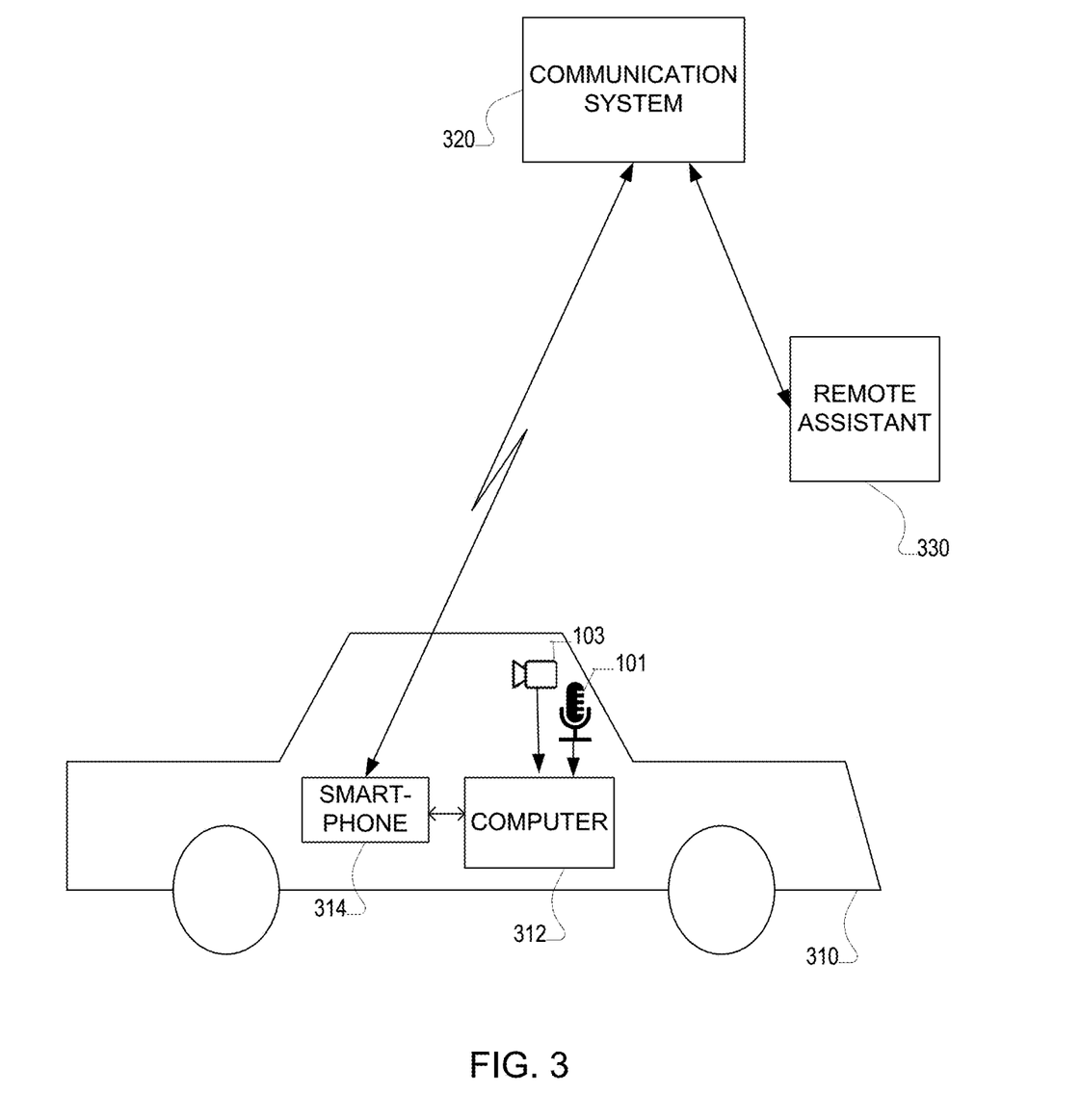
FIG. 3 is a diagram of a vehicle-based system.

Referring to FIG. 3, in one implementation, the system is integrated into a vehicle 310, with the microphone 101, camera 103, etc., monitoring the driver (not shown). The components illustrated in FIG. 1 are hosted on a computer 312 (i.e., an embedded computation system with a general purpose or special purpose processor), which may include non-transitory storage holding instructions to be executed by a processor of the computer to implement the functions described above. In some examples, the computer 312 connects to a user's smartphone 314, which may host the assistant or one of the sub-assistants known to the system. In some examples, the smartphone 314 provides a communication link via a communication system 320 (e.g., via a cellular telephone system, e.g., a "5G" system) to a remote assistant 330, such as a home-based assistant in the user's home remote from the vehicle. It should be understood that certain functions may be implemented in dedicated hardware rather than being performed by a processor, for example, with audio processing being performed by a hardware-based (i.e., dedicated circuitry) component. In some implementations, some or all of the functions that might be performed by the computer 312 are performed by a remote server computer in communication with components hosted in the vehicle.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method for processing voice commands from a user, the method comprising:
   receiving a first audio input acquired while the user utters a first utterance;
   receiving a first video input including video of the user acquired in conjunction with acquiring the first audio input;
   determining that the first utterance includes a command directed to a system based at least in part on
      processing the first audio input, and
      processing the first video input including identifying a visual characteristic associated with the user uttering the first utterance; and
   causing the system to act on the command after determining that the first utterance includes the command directed to the system.

2. The method of claim 1, further comprising performing a further processing of the first audio input to determine the command.

3. The method of claim 1, wherein processing the first audio input includes identifying an acoustic characteristic associated with the user uttering the first utterance.

4. The method of claim 3, wherein the acoustic characteristic is processed jointly with processing the first video input.

5. The method of claim 4, wherein processing the first audio input further includes locating a predetermined word associated with a command directed to the system.

6. The method of claim 1, wherein processing the first audio input includes locating a predetermined word associated with a command directed to the system.

7. The method of claim 1, wherein causing the system to act on the command comprises causing an assistant of a vehicle to act on the command.

8. The method of claim 1, wherein the visual characteristic includes a facial characteristic or a lip movement of the user.

9. The method of claim 1, wherein at least some of the processing of the first audio input uses a neural network.

10. The method of claim 9, wherein the neural network is trained on a plurality of audio recordings of users making utterances, wherein at least some of the audio recordings include a user uttering a command directed to a system and, in at least some other audio recordings, a user does not utter a command directed to a system.

11. The method of claim 1, wherein at least some of the processing of the first video uses a neural network.

12. The method of claim 11, wherein the neural network is trained on a plurality of video recordings of users making utterances, wherein at least some of the video recordings include a user uttering a command directed to a system and, in at least some other video recordings, a user does not utter a command directed to a system.

13. The method of claim 1, further comprising:
   receiving a second audio acquired while the user utters a second utterance; and
   determining that the second audio input is an input not directed to the system.

14. The method of claim 1 wherein the user is an occupant of a vehicle and the system is an infotainment system at least partially installed in the vehicle and configured to receive service voice commands received from occupants of the vehicle.

15. The method of claim 14 wherein the audio input and the video input are captured by sensors installed in the vehicle and in the presence of the user.

16. The method of claim 1 wherein determining that the first utterance includes a command directed to the system includes inferring from the user's face in the video input and from acoustic characteristics of the utterance in the audio input that the user intends the utterance to be a command directed to the system.

17. A method for processing voice commands from a user, the method comprising:
   receiving a first audio input acquired while the user utters a first utterance;
   receiving a first video input including video of the user acquired in conjunction with acquiring the first audio input;
   determining that the first utterance includes a command directed to a system based at least in part on
      processing the first audio input, and
      processing the first video input including identifying a visual characteristic associated with the user uttering the first utterance; and causing the system to act on the command after determining that the first utterance includes the command directed to the system;
   wherein determining that the first utterance includes a command directed to a system further comprises using a state of a dialog between the system and the user in the determining.

18. A voice-based system comprising:
   an audio input device;
   a video input device; and
   a computing device configured to:
      receive a first audio input acquired while the user utters a first utterance,
      receive a first video input including video of the user acquired in conjunction with acquiring the first audio input,
      determine that the first utterance includes a command directed to a system based at least in part on
         processing the first audio input, and
         processing the first video input including identifying a visual characteristic associated with the user uttering the first utterance, and
      cause the system to act on the command after determining that the first utterance includes the command directed to the system.

19. A non-transitory machine-readable medium comprising instructions stored thereon, wherein the instructions when executed by a processor cause the processor to:
   receive a first audio input acquired while the user utters a first utterance,
   receive a first video input including video of the user acquired in conjunction with acquiring the first audio input,
   determine that the first utterance includes a command directed to a system based at least in part on
      processing the first audio input, and
      processing the first video input including identifying a visual characteristic associated with the user uttering the first utterance, and cause the system to act on the command after determining that the first utterance includes the command directed to the system.

* * * * *